Dec. 21, 1943.  K. W. NEBEL  2,337,206
METAL CUTTING SHEAR
Filed April 29, 1941  2 Sheets-Sheet 1
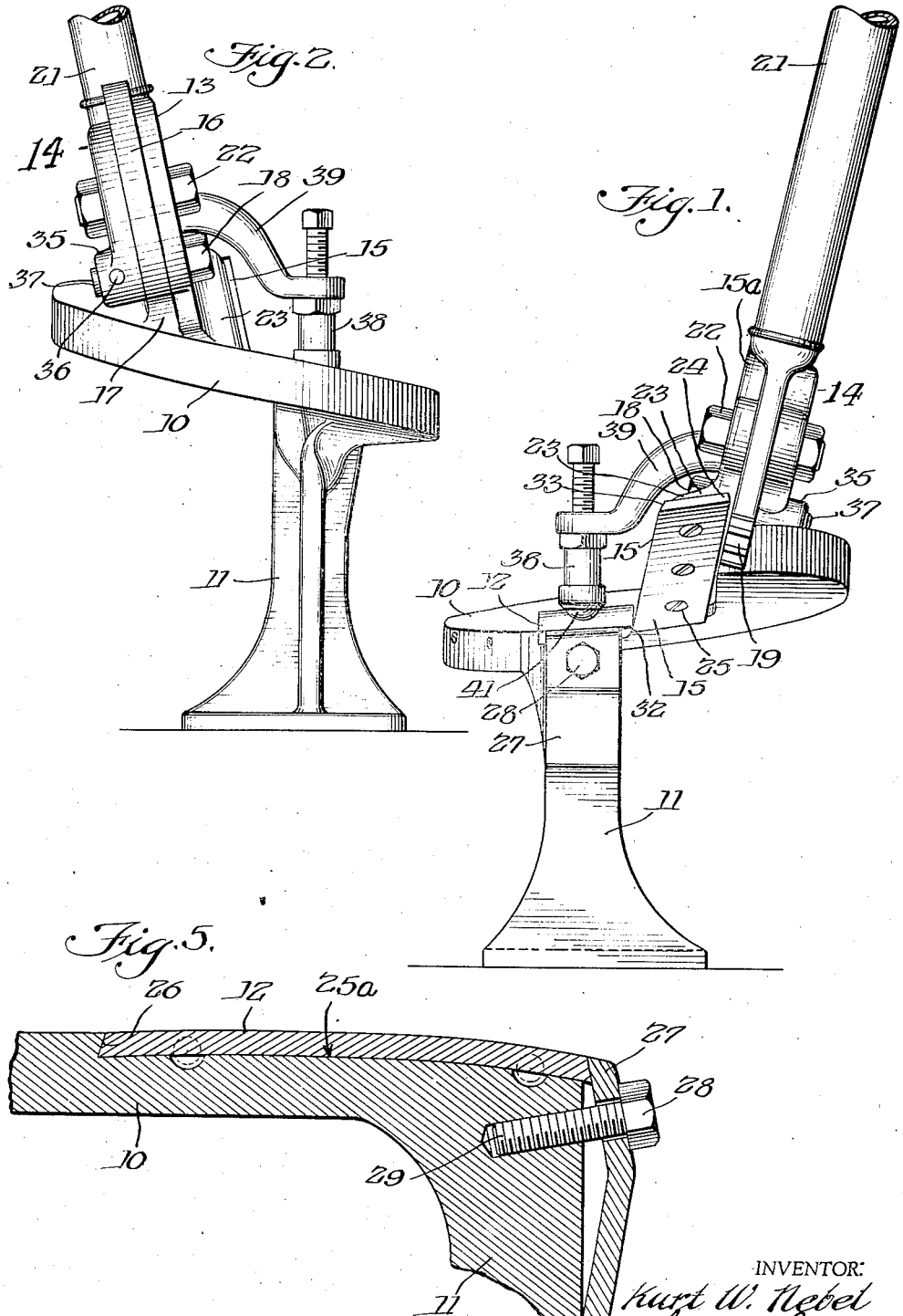
INVENTOR:
Kurt W. Nebel
By Stevens & Batcheler
ATTORNEYS Dec. 21, 1943.  K. W. NEBEL  2,337,206

METAL CUTTING SHEAR

Filed April 29, 1941  2 Sheets-Sheet 2

INVENTOR:
Kurt W. Nebel
BY Stevens & Batchelor
ATTORNEYS.

Patented Dec. 21, 1943

2,337,206

UNITED STATES PATENT OFFICE 2,337,206

METAL CUTTING SHEAR

Kurt W. Nebel, Chicago, Ill.

Application April 29, 1941, Serial No. 390,991

5 Claims. (Cl. 164—44)

The present invention is an improvement over the one patented by me and B. Schubert on January 26, 1932, under No. 1,842,943, and one object of the improvement is to incorporate features into the machine which make for greater precision and reliability of the operative mechanism.

A further object of the improved machine is to include features which add facility and ease to the cutting operation.

Another object of the improved machine is to include a hold-down device which does not impart injury to the work.

With the above objects in view, and any others which may suggest themselves from the description to follow, a better understanding of the improved machine may be had by referring to the accompanying drawings, in which—

Fig. 1 is a front elevation of the machine;

Fig. 2 is a rear elevation;

Fig. 5 is an enlarged section on the line 5—5 of Fig. 4.

Figure 3:
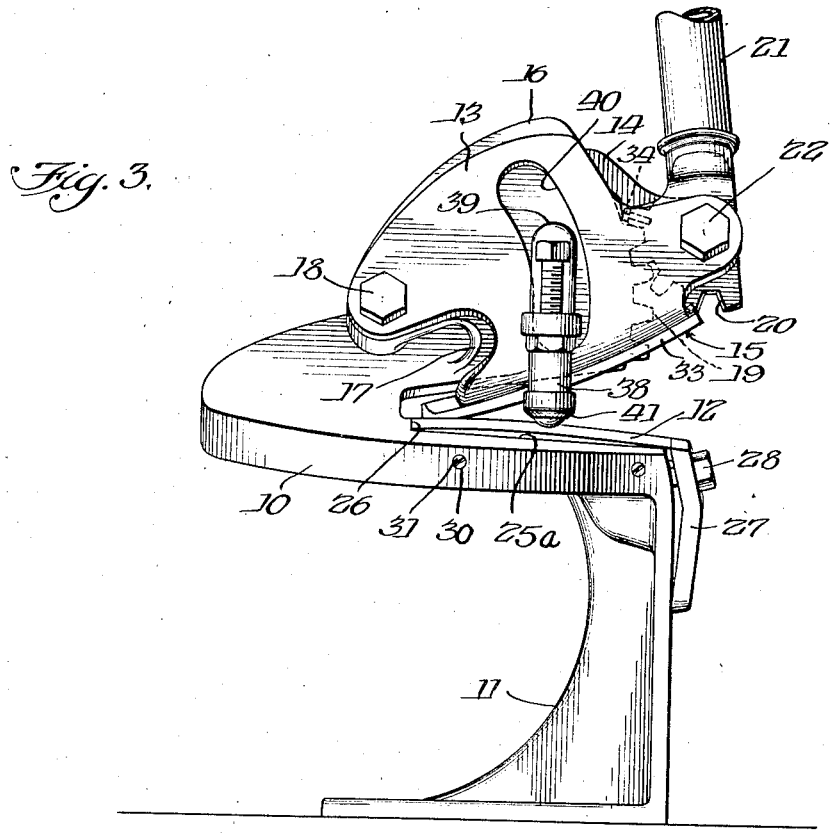
Fig. 3 is a side view as seen from the left hand side of Fig. 1.
Figure 4:
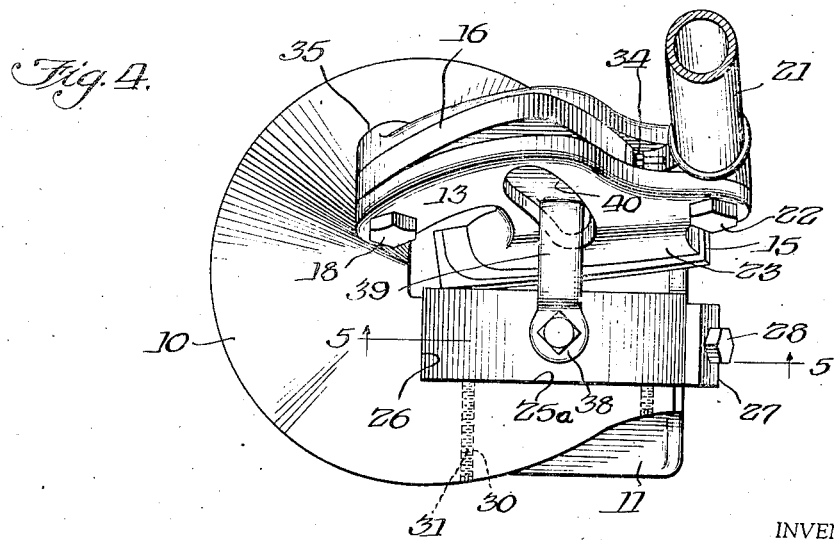
Fig. 4 is a top plan view of Fig. 3.

Basically, the improved machine follows the lines of the patented one, having its base plate at 10 and frontal foot or post therefor at 11. As before, the base plate carries the lower cutting blade 12, while one of a pair of side plates 13 and 14 carries the upper cutting blade 15. The side plates 13 and 14 are designed to operate together alongside a center plate 16 built up from the base plate 10 as indicated at 17, the side plates being pivoted to the center plate at the rear by means of a cross-bolt 18.

The center plate 16, which is rigid, is formed with an arcuate gear rack 19 along which a pinion rack 20 carried by a lever 21 is adapted to roll, as in the previous instance, the pinion rack being rotatable on a cross-bolt 22. Thus, when the lever 21 is drawn toward the right—as seen in Fig. 3—the effect will be to swing the side plates 13 and 14 downwardly and lower the upper cutting blade 15, so that the ultimate position of the lever will be practically horizontal, the lever and the rack pinion falling to a lower level.

It will be noted from Fig. 1 that the upper cutting blade 15 is carried by an outward offset 23 of the side plate 13, such offset having a shoulder 24 against which the inner edge of the blade seats. Since the strain upon the blade during its operation is partially in an outward direction, it is evident that the shoulder 24 provides a stop to prevent the blade from creeping laterally and shearing the bolts 25 which secure the blade to the offset 23.

The lower cutting blade 12 is mounted similarly to the one in the patent, but secured otherwise. Thus, the recess 25a in which the blade seats has its rear end 26 undercut to receive the beveled corresponding edge of the blade. The latter is similarly formed at its front edge, but receives an arched clamp 27 at this point. A bolt 28 passes through the clamp to thread into the stock of the post 11, as indicated at 29. Thus, the clamp 27 secures the blade 12 firmly in the recess 25a and also against endwise movement without the use or need of screws or other securing means.

The lower blade 12 is also laterally adjustable in the improved machine. Thus, the stock of the base plate 10 is made with tapped bores 30 from the outside in the direction of the blade 12, screws 31 being driven into the bores to meet the blade. These screws are preferably fully contained in the bores, so that no parts thereof may project to the outside and be in the way. When the bolt 28 is slightly loosened, it is possible to adjust the advance of the blade 12 accurately in relation to the upper blade 15, the screws 31 forming a sufficient backing for the blade 12, and the adjustment becoming fixed when the bolt 28 is again tightened.

It will be noted that the cutting blades 12 and 15 are somewhat curved longitudinally and outwardly from each other. This construction lessens the angle between the blades at the zone of the cut and reduces the tendency of the upper blade to push the work forward or ride the same as such blade is lowered. Instead, the blade actually secures a greater downward purchase on the work, gripping the same as it imposes the cut. A good hold and fast cut are therefore secured, and no slippage or loss of time involved.

It is noted particularly in Fig. 2 of the aforesaid patent that the links 12 and center plate 10 are short, whereas the side plates 13 and 14, as well as the center plate 16 in the improved machine, are of much greater height. The improved construction gives the parts a far greater area of contact than before. Therefore, when a cut imposes a twisting or lateral strain upon the blade 15, the plates 13 and 14 secure a considerable sliding bearing in the center plate 16 to absorb the strain without buckling or twisting tendencies that would be otherwise transmitted to the upper part of the shear.

An important feature in the improved machine is the operation of the cutting stroke in a plane inclined to the bed or base plate 10 of the machine. Fig. 1 shows that the cutting edge 32 of the lower blade 12 is beveled downwardly, the reason for this being to afford a clearance to the departing portion of the work. For purposes of efficiency the upper blade should follow or conform to the edge of the lower one during the cutting operation. Primarily, the cutting edge 33 of the upper blade 15 is beveled similarly to the edge 32 of the lower blade for the purpose just mentioned. However, this alone will not suffice to secure the parallel or conforming travel of the edge 33 along the edge 32, and the entire shear structure above the base plate is therefore tilted to the angle shown in Figs. 1 and 2 in order to impart the proper course of travel to the upper blade 15. Thus, a close shearing cut is obtained; and the bottom of the blade 15 rises gradually from the zone of the cut so as not to bear on the work. Moreover, the blades have more acute cutting edges than before, and are therefore sharper.

In respect to cutting efficiency or purchase, it is noted that the rack 19 recedes somewhat by its arcuate form in a downward direction, so that by following the rack the pinion 20 combines a slightly rearward travel with its downward movement. This action gives the upper blade 15 a slight rearward movement as it descends in relation to the blade 12, such movement being in effect a shearing one, and easing the cutting operation.

Fig. 3 shows the blade 15 at the inception of the cutting operation for ordinary work, the upward limit for the blade being secured by a screw 34 at the top of the pinion rack 20 meeting the profile of the gear rack. However, when fine work must be done, it is advisable to give the shear an earlier start, and this is done by removing the screw 34. The lever 21 can then be swung back a further distance to open the blade 15 more in relation to the blade 12 and enable the work to be set more deeply, where the edges of the blades have had little or no wear.

Fig. 2 shows that the side plate 14 is extended with a boss 35 in a downward direction to afford room for a set-screw 36 which is directed toward the shank 37 of the bolt 18. It will be appreciated that the adjustment of this bolt must be accurate in order to provide no more than a sliding clearance between the side plates 13 and 14 and the center plate 16. Therefore, the purpose of the set-screw 36 is to fix the bolt in the adjusted position. In order that this adjustment may not vary after the assembly has been taken apart for cleaning or repair and replaced, the bolt shank 37 is made with a conical dent or countersink opposite the set-screw 36 to seat the inner end thereof. Therefore, it is an easy matter to set the bolt 18 when the replacement is made.

As in the patented machine, a hold-down device 38 is provided, the same being extended from the center plate 16 by a bracket 39 which necessarily passes through a slot 40 made in the side plate 13. While the hold-down device is not generally novel, an important addition has been made to it in the form of a bottom ball bearing 41. This feature permits the work to slide or be fed with ease while it is still held down with pressure.

It will be evident from the above description that the improved form of the shear includes a number of important features. These deal primarily with the mounting of the cutting blades in a manner to be both secure, yet easily removable in case they are to be sharpened or replaced. Also, a fine and durable adjustment is provided for the lower cutting blade to hold it in the proper relation to the upper one, and to take up wear. The curved form of the blades as well as the course of the upper blade, making for a reliable and shearing cut, are features which reduce the operating effort and save time. The tilt of the operating mechanism makes for a sharp and close cut, while allowing the desirable clearance for the work away from the lower blade. And the construction of the upper unit insures the true travel as well as an ample bearing for the upper blade carrier, so that the same may remain firm and retain its proper form and adjustment despite the strains incident to long and hard use. Finally, the improved machine retains its strudy and compact design, and has acquired its novel features without the addition of any complicated or delicate parts.

While I have described the improved machine along specific lines, it is apparent that minor changes or refinements may be made therein without departing from its principle, and I desire to consider such changes and refinements as coming within the scope and spirit of the appended claims.

I claim:

1. A shear having a substantially U-shaped bed, a stationary cutting blade carried by one arm of said bed, a guide plate rising from the other arm, a side plate pivoted at one end of said guide plate and swingable along the same on the side proximate to said stationary blade, and a companion cutting blade carried by the side plate and cooperative with said stationary cutting blade on the down-swing of the side plate, said stationary cutting blade having its cutting edge undercut, and said guide plate and side plate being tilted away from said first-mentioned bed arm, whereby to impart a course to said companion cutting blade substantially parallel to said edge on the down-swing of the side plate, the cutting edge of said companion cutting blade being beveled in an upward direction in parallelism to the cutting edge of said stationary cutting blade.

2. A shear having a substantially U-shaped bed, a stationary cutting blade carried by one arm of said bed, a companion cutting blade movably carried by the other arm to cooperate with said stationary cutting blade, the latter seating in a longitudinal surface recess of the first-mentioned arm and extending beyond the end of the same, and a clamp engaging the extended end of said stationary cutting blade to maintain the same in the seated position, the inner end of said recess being undercut, and the corresponding end of the stationary cutting blade being similarly beveled to become locked in said position.

3. A shear having a substantially U-shaped bed, a stationary cutting blade carried by one arm of said bed, a companion cutting blade movably carried by the other arm to cooperate with said stationary cutting blade, the latter seating in a longitudinal surface recess of the first-mentioned arm and extending beyond the end of the same, and a clamp engaging the extended end of said stationary cutting blade to maintain the same in the seated position, the inner end of said recess being undercut and the ends of said stationary cutting blade upwardly beveled, the inner end of such blade becoming locked by fitting in said inner recess end, and said clamp being deflected according to the bevel of said extended end, whereby to apply both downward and inward pressure to the same.

4. A shear having a substantially U-shaped bed, a stationary cutting blade carried by one arm of said bed, a companion cutting blade movably carried by the other arm to cooperate with said stationary cutting blade, the latter seating in a longitudinal surface recess of the first-mentioned arm and extending beyond the end of the same, and a clamp engaging the extended end of said stationary cutting blade to maintain the same in the seated position, the inner end of said recess being undercut and the ends of said stationary cutting blade upwardly beveled, the inner end of such blade becoming locked by fitting in said inner recess end, and said clamp comprising an arch drawn with one end to the stock of said first-mentioned arm and with the other against said extended end of the stationary cutting blade, such other end being directed to fit the bevel of said extended end, whereby to apply both downward and inward pressure to the same.

5. A shear having a substantially U-shaped bed, a stationary cutting blade carried by one arm of said bed, a companion cutting blade movably carried by the other arm to cooperate with said stationary cutting blade, the latter seating in a longitudinal surface recess of the first-mentioned arm and extending beyond the end of the same, and a clamp engaging the extended end of said stationary cutting blade to maintain the same in the seated position, the inner end of said recess being undercut and the ends of said stationary cutting blade upwardly beveled, the inner end of such blade becoming locked by fitting in said inner recess end, and said clamp comprising an arch bridging said extended end and the end of said first-mentioned arm, said last-mentioned end being tapped and the arch perforated in alinement, and a bolt directed with its shank through the perforation in the arch and to thread into said tapered end, the part of the arch engaging said extended end being formed to fit the bevel thereof, whereby to apply both inward and downward pressure to such extended end when the bolt is advanced.

KURT W. NEBEL.